US012322919B2

(12) United States Patent
Villard et al.

(10) Patent No.: US 12,322,919 B2
(45) Date of Patent: Jun. 3, 2025

(54) ELECTRICAL ASSEMBLY WITH A PLUGGABLE CONNECTOR HAVING A THROUGH-OPENING FOR A RECEIVING A CONDUCTOR ADAPTER

(71) Applicant: Tyco Electronics France SAS, Pontoise (FR)

(72) Inventors: Romain Villard, Pontoise (FR); Geoffrey Moine, Pontoise (FR)

(73) Assignee: TE Connectivity Solutions GmbH, Schaffhausen (CH)

( * ) Notice: Subject to any disclaimer, the term of this patent is extended or adjusted under 35 U.S.C. 154(b) by 208 days.

(21) Appl. No.: 17/737,111

(22) Filed: May 5, 2022

(65) Prior Publication Data

US 2022/0359998 A1 Nov. 10, 2022

(30) Foreign Application Priority Data

May 5, 2021 (EP) .................................... 21305582

(51) Int. Cl.

| | |
|---|---|
| ***H01R 9/24*** | (2006.01) |
| ***H01R 4/18*** | (2006.01) |
| ***H01R 4/48*** | (2006.01) |
| ***H01R 9/26*** | (2006.01) |
| ***H01R 13/42*** | (2006.01) |

(52) U.S. Cl.

CPC ............ *H01R 9/2491* (2013.01); *H01R 4/18* (2013.01); *H01R 4/4848* (2023.08); *H01R 9/26* (2013.01); *H01R 13/42* (2013.01); *H01R 4/4823* (2023.08)

(58) Field of Classification Search

None

See application file for complete search history.

(56) References Cited

U.S. PATENT DOCUMENTS

| | | | | |
|---|---|---|---|---|
| 7,374,465 | B2 * | 5/2008 | Tanaka ............... | H01R 13/5205 439/852 |
| 8,328,588 | B2 * | 12/2012 | Ramm .................. | H01R 13/111 439/828 |
| 9,793,636 | B2 | 10/2017 | France et al. | |
| 11,217,925 | B2 * | 1/2022 | Tsuchiya .............. | H01R 13/114 |

(Continued)

FOREIGN PATENT DOCUMENTS

| | | | |
|---|---|---|---|
| DE | 202008002358 | U1 | 4/2009 |
| DE | 102016109427 | B3 | 10/2017 |

(Continued)

OTHER PUBLICATIONS

Machine translation of DE 20 2008 00 2358 (Year: 2008).*

(Continued)

*Primary Examiner* — Ross N Gushi

(74) *Attorney, Agent, or Firm* — Barley Snyder

(57) ABSTRACT

An electrical assembly includes a terminal block including a conductive bar having a connection end extending within a receiving recess of the terminal block, a pluggable connector releasably mounted on the terminal block, and a conductor adapter having a receptacle cooperating with the connection end in the mounted position. The connection end of the conductive bar extends in an insertion direction of the pluggable connector in a mounted position within the receiving recess. The pluggable connector has a central through-opening receiving and removably clipping the conductor adapter.

18 Claims, 3 Drawing Sheets

(56) References Cited

U.S. PATENT DOCUMENTS

| | | | | |
|---|---|---|---|---|
| 11,309,653 | B2 * | 4/2022 | Kai .................... | H01R 13/4223 |
| 2012/0252262 | A1 | 10/2012 | Reibke et al. | |
| 2015/0255896 | A1 | 9/2015 | Niemann | |
| 2016/0079698 | A1 | 3/2016 | France et al. | |
| 2016/0087355 | A1 | 3/2016 | France et al. | |
| 2017/0117657 | A1 | 4/2017 | Inoue | |
| 2020/0303858 | A1 * | 9/2020 | Inoue ................. | H01R 13/4223 |

FOREIGN PATENT DOCUMENTS

| | | | |
|---|---|---|---|
| EP | 0732771 | A2 | 3/1996 |
| FR | 2534076 | A1 | 4/1984 |
| FR | 3025947 | A1 | 3/2016 |
| JP | H8250176 | A | 9/1996 |
| WO | 2020099552 | A1 | 5/2020 |

OTHER PUBLICATIONS

European Search Report and Written Opinion, Application No. 21305582.5-1201, Dated: Nov. 12, 2021, 6 pages.

Office Action from Japan's Patent Office dated May 23, 2023 with English translation, corresponding to Application No. 2022-072940, 7 pages.

* cited by examiner

ELECTRICAL ASSEMBLY WITH A PLUGGABLE CONNECTOR HAVING A THROUGH-OPENING FOR A RECEIVING A CONDUCTOR ADAPTER

CROSS-REFERENCE TO RELATED APPLICATIONS

This application claims the benefit of the filing date under 35 U.S.C. § 119(a)-(d) of European Patent Application No. 21305582.5, filed on May 5, 2021.

FIELD OF THE INVENTION

The present invention concerns an electrical assembly and, more particularly, an electrical assembly with a pluggable connector having a through-opening for a receiving a conductor adapter.

BACKGROUND

It is known to use an electrical assembly comprising a terminal block and a pluggable connector configured to be removably mounted on said terminal block. The pluggable connector acts as an intermediate plugging part to electrically connect an external conductor to a conductive bar of the terminal block. The pluggable connector can be easily dismounted and mounted again on the terminal block while the external conductor remains plugged in the pluggable connector.

This advantageous modular construction, however, implies that the pluggable connector should have a conducting portion and two connecting elements built within; a first connecting element is connected to the external conductor and a second connecting element is designed to cooperate with a complementary end of the conductive bar. As an intermediate plugging part, the pluggable connector should therefore have a complex construction with a lot of parts having different functions (insulating casing, conducting portion, clipping devices or springs acting as connecting elements). There is therefore a need to simplify the construction of the pluggable connector.

SUMMARY

An electrical assembly includes a terminal block including a conductive bar having a connection end extending within a receiving recess of the terminal block, a pluggable connector releasably mounted on the terminal block, and a conductor adapter having a receptacle cooperating with the connection end in the mounted position. The connection end of the conductive bar extends in an insertion direction of the pluggable connector in a mounted position within the receiving recess. The pluggable connector has a central through-opening receiving and removably clipping the conductor adapter.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
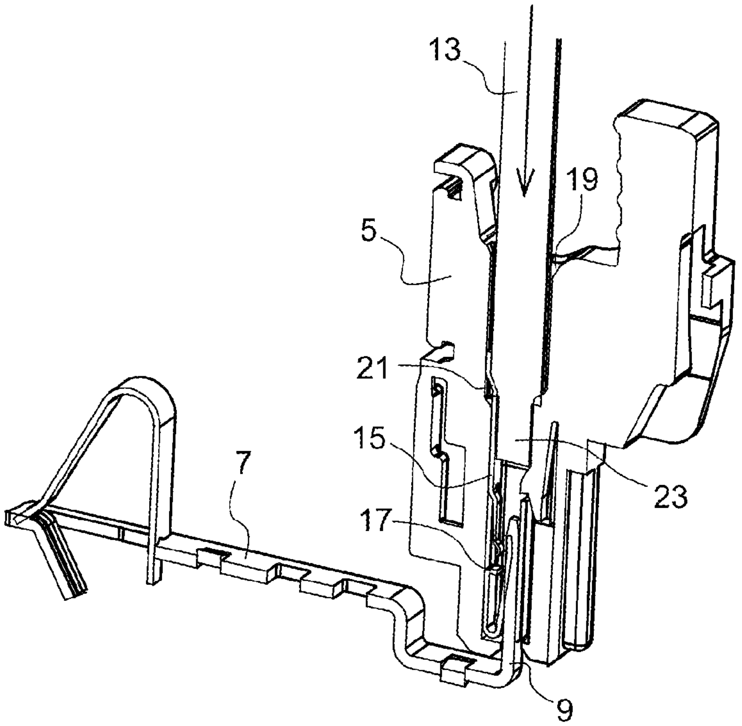
FIG. 1 is a sectional perspective view of a conductive bar of a terminal block, a conductor adapter, a conductive wire end in mounted position, and a pluggable connector.

The invention shall be explained in more detail hereafter by way of example with reference to embodiments shown in the drawings. The developments and configurations shown there are each independent of one another and can be combined with one another depending on the application. In the following detailed description, the same elements or the elements that are fulfilling identical functions may retain the same references so as to simplify the understanding of the invention.

As shown in FIGS. 1-6, an electrical assembly 1 comprises a terminal block 3 and a pluggable connector 5 configured to be releasably mounted on the terminal block 3.

Figure 5:
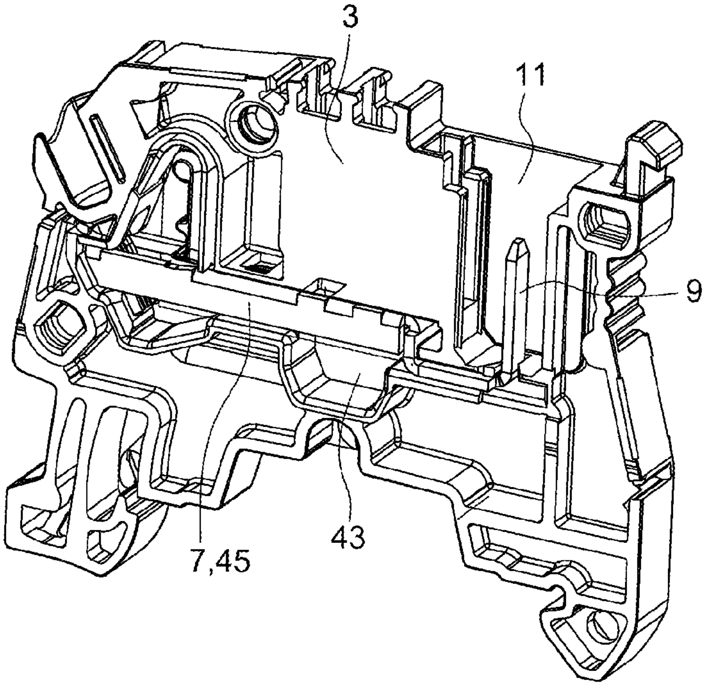
FIG. 5 is a perspective view of the terminal block.
Figure 6:
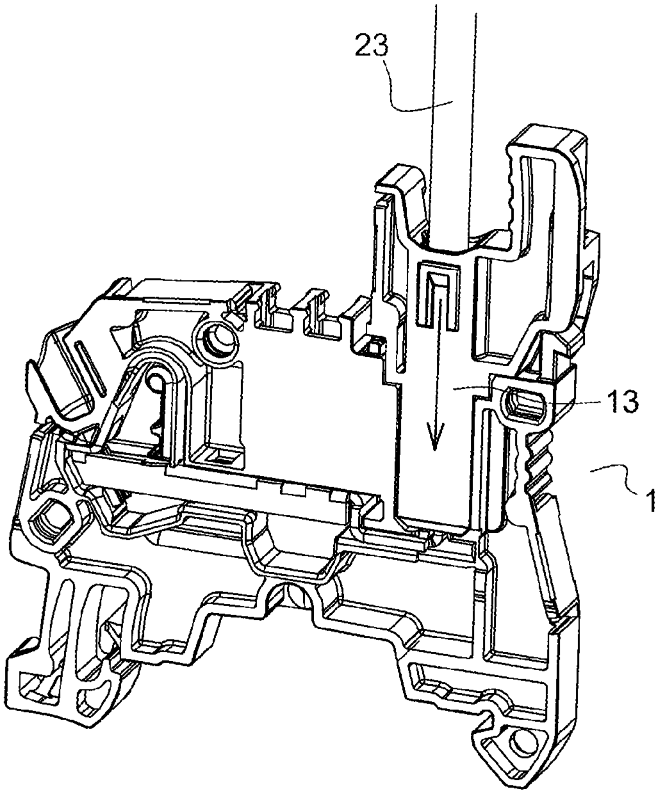
FIG. 6 is a perspective view of an electrical assembly including the pluggable connector, the terminal block, the conductor adapter, and the conductive wire end in mounted position.

The terminal block 3 includes a conductive bar 7 provided with a connection end 9 extending within a receiving recess 11 of the terminal block 3, as shown in FIG. 5. The connection end 9 extends according to an insertion direction 13 of the pluggable connector 5 in a mounted position within the receiving recess 11.

The electrical assembly 1 also comprises a conductor adapter 15 provided with a receptacle 17, shown in FIG. 1, configured to cooperate with the connection end 9 in mounted position, the pluggable connector 5 having a central through-opening 19 adapted to receive and removably clip the conductor adapter 15. The pluggable connector 5 is adapted to cooperate with a separate element inserted in the central through-opening 19, said separate element being the conductor adapter 15 that is configured to directly cooperate with the conductive bar 7.

Figure 2:
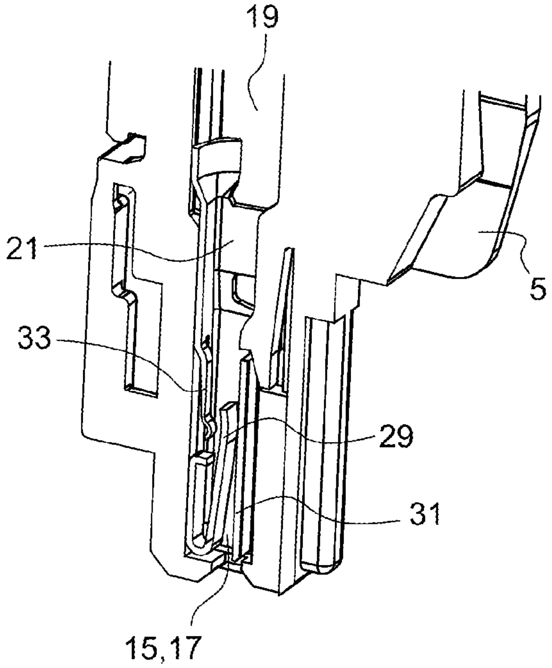
FIG. 2 is a sectional perspective view of the pluggable connector and the conductor adapter.
Figure 3:
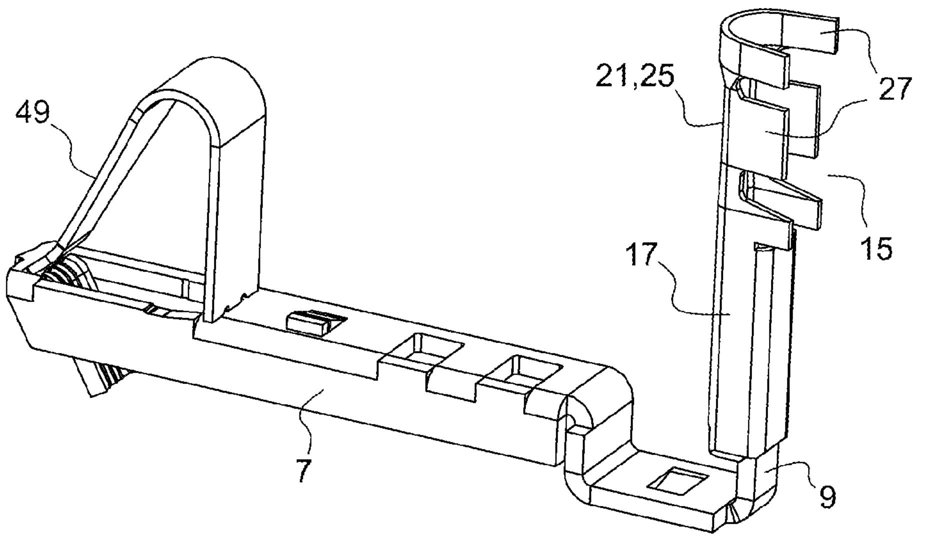
FIG. 3 is a perspective view of the conductive bar and the conductor adapter in mounted position.

The conductor adapter 15 comprises a crimp connection 21 configured to cooperate with a conductive wire end 23, as shown in FIGS. 1-3. The conductor adapter 15 with the attached conductive wire end 23 thus form a cooperative unit that can cooperate with the pluggable connector 5. The conductive wire end 23 is part of the electrical assembly 1. The conductive wire end 23 can be secured on the conductor adapter 15 and then can removably fix the conductor adapter 15 with the attached conductive wire end 23 within the pluggable connector 5.

The crimp connection 21 is linked to and aligned with the receptacle 17 so that, in mounted position, the conductive wire end 23 extends according to the insertion direction 13, as shown in FIG. 1. The conductor adapter 15 forms an elongated part that is configured to be aligned with the conductive wire end 23 and also with the connection end 9 of the conductive bar 7 in mounted position. The conductive wire end 23 is not directly in contact with the connection end 9, the conductor adapter 15 is used as an additional part to electrically connect them. The conductor adapter 15 is a hollow part defining an internal area wherein the conductive wire end 23 and the connection end 9 are located in mounted position.

The connection end 9 and the conductive wire end 23 are distant in mounted position. The hollow part 15 is divided in two portions: the receptacle 17 and the crimp connection 21.

The crimp connection 21, as shown in FIG. 3, comprises a fix part 25 and several opposed lateral arms 27 to be crimped over the conductive wire end 23.

The receptacle 17 includes a movable folded portion 29, shown in FIG. 2, configured to maintain in position the connection end 9 against a contact surface 31 of the interior of the receptacle 17 in mounted position. The provision improves the quality of the electrical contact in mounted position. The receptacle 17 is a folded metal sheet forming a rectangular based elongated structure. A wall of the receptacle 17 includes a cut and folded portion 33 configured to cooperate and limit the movements of the movable folded portion 29 when introducing the connection end 9. This construction offers a good position maintaining of the connection end 9 in mounted position.

Figure 4:
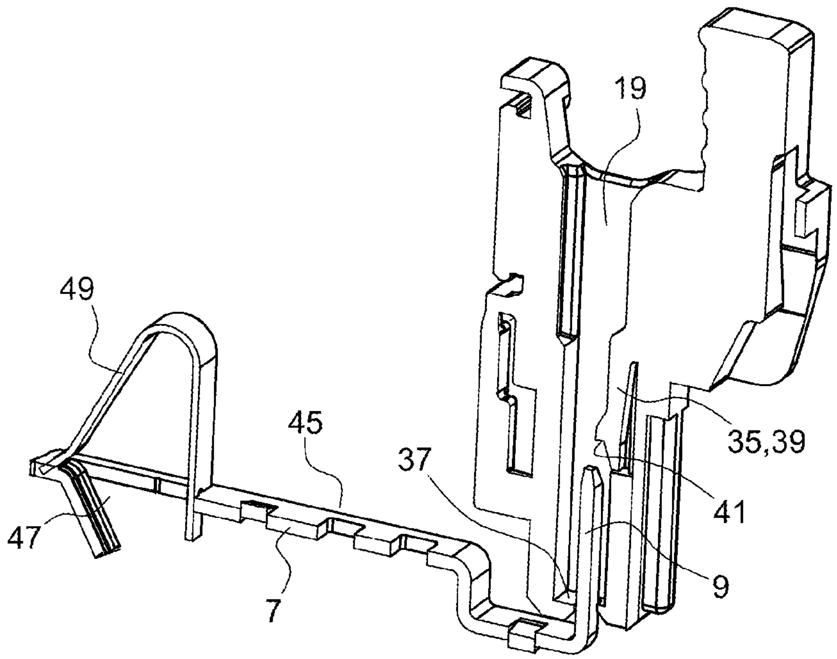
FIG. 4 is a sectional perspective view of the pluggable connector and the conductive bar in mounted position.

The central through-opening 19 is provided with a guiding and receiving system 35, shown in FIG. 4, for the conductor adapter 15. The guiding and receiving system 35 includes an abutment wall 37 extending transversally to the insertion direction 13 in mounted position and a clipping leg 39 for maintaining the conductor adapter 15 in an installed position within the central through-opening 19. This provision enables to maintain in position the conductor adapter 15 within the pluggable connector 5.

The clipping leg 39 is adapted for the withdrawal of the conductor adapter 15 with a dedicated tool. There is, however, no need of a tool for mounting and dismounting the pluggable connector 5 in the terminal block 3. The clipping leg 39 extends substantially according to or at an incline with respect to the insertion direction 13 in mounted position. The clipping leg 39 presents a blocking surface 41 extending transversally to the insertion direction 13 in mounted position, as shown in FIG. 4, the blocking surface 41 being configured to cooperate with a complementary surface of the conductor adapter 15. This provision enables a good position maintaining with a simple construction.

The pluggable connector 5 is constituted by a one-piece insulating casing. This provision simplifies the construction of the electrical assembly 1. Indeed, there is no electrical or conducting part in the pluggable connector 5. The pluggable connector 5 is constituted of plastic, that is to say it only comprises plastic in an embodiment. The clipping leg 39 is articulated to allow the withdrawal of the conductor adapter 15. In an embodiment, the pluggable connector 5 is a molded part with a geometry that enables a one molding operation for obtaining it.

The terminal block 1 presents a lateral opening 43 for receiving the conductive bar 7, as shown in FIG. 5. The conductive bar 7 comprises a main part 45 extending transversally to the insertion direction 13, the connection end 9 being a folded part linked to the main part 45. The connection end 9 is not only a plug end designed to cooperate with a complementary plug end that is the receptacle 17, but it is also a part of the conductive bar 7 that is simply obtained by folding the conductive bar 7. The connection end 9 is an elongated flat portion of the conductive bar 7 finished by a narrowing extremity. The narrowing extremity facilitates the cooperation with the receptacle 17.

The terminal block 1 comprises a molded insulating housing wherein the lateral opening 43 is formed. The insulating housing 1 is constituted of plastic, that is to say it only comprises plastic. The insulating housing 1 is configured to be plugged on a support rail, such as a DIN rail.

The main part 45 of the conductive bar 7 comprises at least one terminal 47 for an additional conductor to be connected on the terminal block 3, as shown in FIG. 4, the at least one terminal 47 including a cooperation hole and/or a fixation slot for a spring 49 for cooperating with said additional conductor. The conductive bar 7 of the terminal block 3, in an embodiment, is constituted by a single piece that is cut and folded. The conductive bar 7 is configured to be connected to several conductors.

In an embodiment, there is no intermediate part between the conductive bar 7 and the conductor adapter 15. Indeed, the conductor adapter 15 directly cooperates with the conductive bar 7 thanks to their respective extremities, that is to say the receptacle 17 and the connection end 9. The electrical assembly 1 is then simplified as the pluggable connector 5 does not contain intermediate parts for electrical and mechanical connection. The direct electrical connection without intermediate parts also enables to have a reliable electrical connection.

The invention is not limited to the embodiments described above by way of example, but rather encompasses all the variants. The different aspects defined above that are not incompatible can be combined.

What is claimed is:

1. An electrical assembly, comprising:

a terminal block including a conductive bar having a connection end extending within a receiving recess of the terminal block and a main part extending transversally to the connection end, the main part has a top surface, a bottom surface opposite the top surface, and a sidewall extending from the main part beyond the bottom surface, the bottom surface and the sidewall are perpendicular to each other and are formed in a single piece;

a pluggable connector releasably mounted on the terminal block, the connection end of the conductive bar extends in an insertion direction of the pluggable connector in a mounted position within the receiving recess; and a conductor adapter having a receptacle cooperating with the connection end in the mounted position, the pluggable connector has a central through-opening receiving and removably clipping the conductor adapter, the receptacle has a movable folded portion and a cut and folded portion extending toward the movable folded portion, the movable folded portion is cantilevered and has a free end positioned over the cut and folded portion, the cut and folded portion is spaced apart from the movable folded portion in a non-mounted position and limits movement of the movable folded portion in the mounted position, the free end does not contact the cut and folded portion in the non-mounted position.

2. The electrical assembly of claim 1, wherein the conductor adapter has a crimp connection cooperating with a conductive wire end.

3. The electrical assembly of claim 2, wherein the crimp connection is linked to and aligned with the receptacle.

4. The electrical assembly of claim 3, wherein, in the mounted position, the conductive wire end extends in the insertion direction.

5. The electrical assembly of claim 2, wherein the conductor adapter is a hollow part defining an internal area.

6. The electrical assembly of claim 5, wherein the conductive wire end and the connection end are in the internal area in the mounted position.

7. The electrical assembly of claim 1, wherein the movable folded portion maintains the connection end against a contact surface of an interior of the receptacle in the mounted position.

8. The electrical assembly of claim 1, wherein the pluggable connector is constituted by a one-piece insulating casing.

9. The electrical assembly of claim 1, wherein the central through-opening has a guiding and receiving system for the conductor adapter.

10. The electrical assembly of claim 9, wherein the guiding and receiving system has an abutment wall extending transversally to the insertion direction in the mounted position.

11. The electrical assembly of claim 10, wherein the guiding and receiving system has a clipping leg maintaining the conductor adapter in an installed position within the central through-opening.

12. The electrical assembly of claim 11, wherein the clipping leg extends at an incline with respect to the insertion direction in the mounted position.

13. The electrical assembly of claim 12, wherein the clipping leg has a blocking surface extending transversally to the insertion direction in the mounted position, the blocking surface cooperating with a complementary surface of the conductor adapter.

14. The electrical assembly of claim 11, wherein the clipping leg engages a contact surface of the conductor adapter that is on an opposite side of the receptacle from the movable folded portion and the cut and folded portion.

15. The electrical assembly of claim 1, wherein the terminal block has a lateral opening receiving the conductive bar.

16. The electrical assembly of claim 15, wherein the connection end is a folded part linked to the main part.

17. The electrical assembly of claim 16, wherein the main part has a terminal for an additional conductor to be connected on the terminal block.

18. The electrical assembly of claim 17, wherein the terminal has a cooperation hole and/or a fixation slot for a spring of the terminal block cooperating with the additional conductor.

* * * * *